United States Patent
Kwankijpongsa et al.

(10) Patent No.: US 8,870,111 B2
(45) Date of Patent: Oct. 28, 2014

(54) CABLE WINDING DEVICE AND FIXING AND WINDING MECHANISM THEREOF

(75) Inventors: Surawut Kwankijpongsa, Amphur Muang (TH); Jui-Ching Huang, Amphur Muang (TH)

(73) Assignee: Delta Electronics (Thailand) Public Co., Ltd., Amphur Muang (TH)

( * ) Notice: Subject to any disclaimer, the term of this patent is extended or adjusted under 35 U.S.C. 154(b) by 207 days.

(21) Appl. No.: 13/432,288

(22) Filed: Mar. 28, 2012

(65) Prior Publication Data
US 2013/0256446 A1   Oct. 3, 2013

(51) Int. Cl.
*B65H 75/48* (2006.01)
(52) U.S. Cl.
USPC ............ 242/378; 242/378.1; 242/378.2; 242/378.3
(58) Field of Classification Search
CPC .......... B65H 75/4423; B65H 75/4431; B65H 2701/3319
USPC .................. 242/378, 378.1–378.4
See application file for complete search history.

(56) References Cited

U.S. PATENT DOCUMENTS

| 4,417,703 | A | * | 11/1983 | Weinhold | 242/378.3 |
| 5,178,619 | A | * | 1/1993 | Galazaka | 606/41 |
| 7,093,783 | B2 | * | 8/2006 | Warren et al. | 242/385.4 |
| 7,147,177 | B2 | * | 12/2006 | Yen | 242/385.4 |
| 7,455,255 | B1 | * | 11/2008 | Chao | 242/378.1 |
| 7,494,083 | B1 | * | 2/2009 | Yen | 242/378.1 |
| 2004/0232267 | A1 | | 11/2004 | Liao | |
| 2007/0026727 | A1 | | 2/2007 | Lo | |
| 2009/0039191 | A1 | | 2/2009 | Yen | |

FOREIGN PATENT DOCUMENTS

| EP | 2197079 | 6/2010 |
| TW | M360503 | 7/2009 |
| WO | 2004/051817 | 6/2004 |

* cited by examiner

*Primary Examiner* — Sang Kim
(74) *Attorney, Agent, or Firm* — Kirton McConkie; Evan R. Witt (57) ABSTRACT

A cable winding device comprises a case, a reel disc, a cable, and a cable locking structure. The case comprises a first case element and a second case element. The reel disc is disposed between the first case element and the second case element, wherein the reel disc has a leaf spring. The cable is wound on the reel disc. The cable locking structure has a fixing part and at least partially penetrates the first case element and the reel disc. When a pulling operation of the cable causes the leaf spring to be sustained against the fixing part, a desired length of the cable is pulled out from the case and locked. When the cable locking structure is pressed and the fixing part is detached from the leaf spring, the cable pulled outside the case is rewound on the reel disc.

10 Claims, 10 Drawing Sheets

CABLE WINDING DEVICE AND FIXING AND WINDING MECHANISM THEREOF

FIELD OF THE INVENTION

The present invention relates to a winding device, and more particularly to a cable winding device. The present invention also provides a fixing and winding mechanism of the cable winding device.

BACKGROUND OF THE INVENTION

With increasing development of high technology industries, electronics devices such as notebook computers, phones, digital cameras and the like are widely used in our daily lives. Conventionally, these electronic devices are coupled to the power source via the linkage of power cables or communicated with other electronic devices via the linkage of signal cables. In other words, power cables and signal cables are utilized as transmission media for transmitting power and signals, respectively. Since these cables have several meters in length, it is critical to gather these cables for storage. Recently, many cable winding devices have been proposed to wind cables for storage.

Figure 1A:
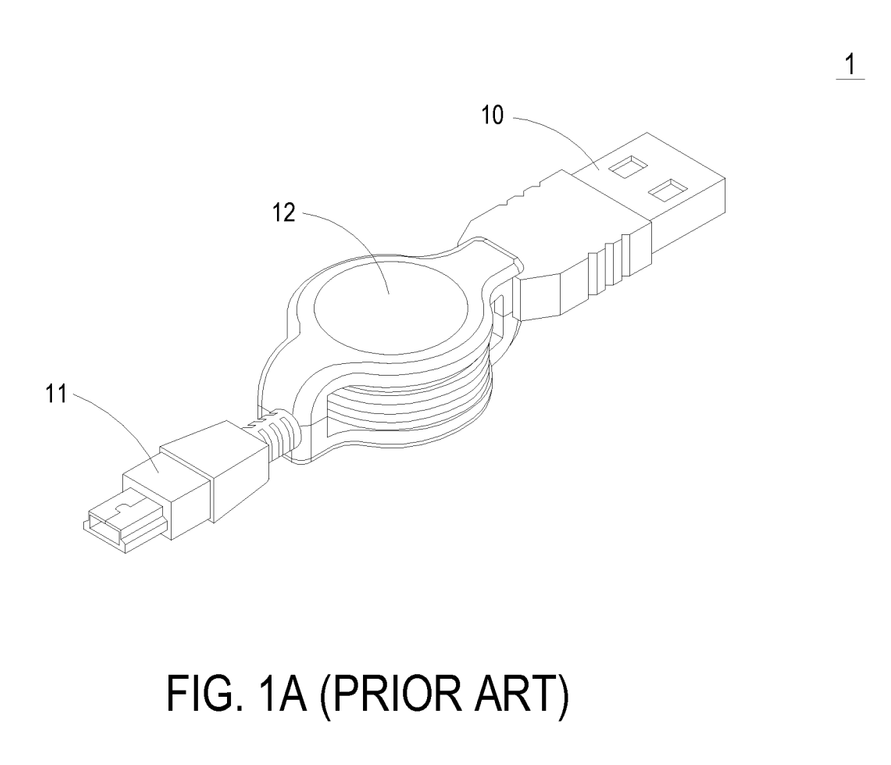
FIG. 1A is a schematic assembled view illustrating a conventional USB cable adapter.
Figure 1B:
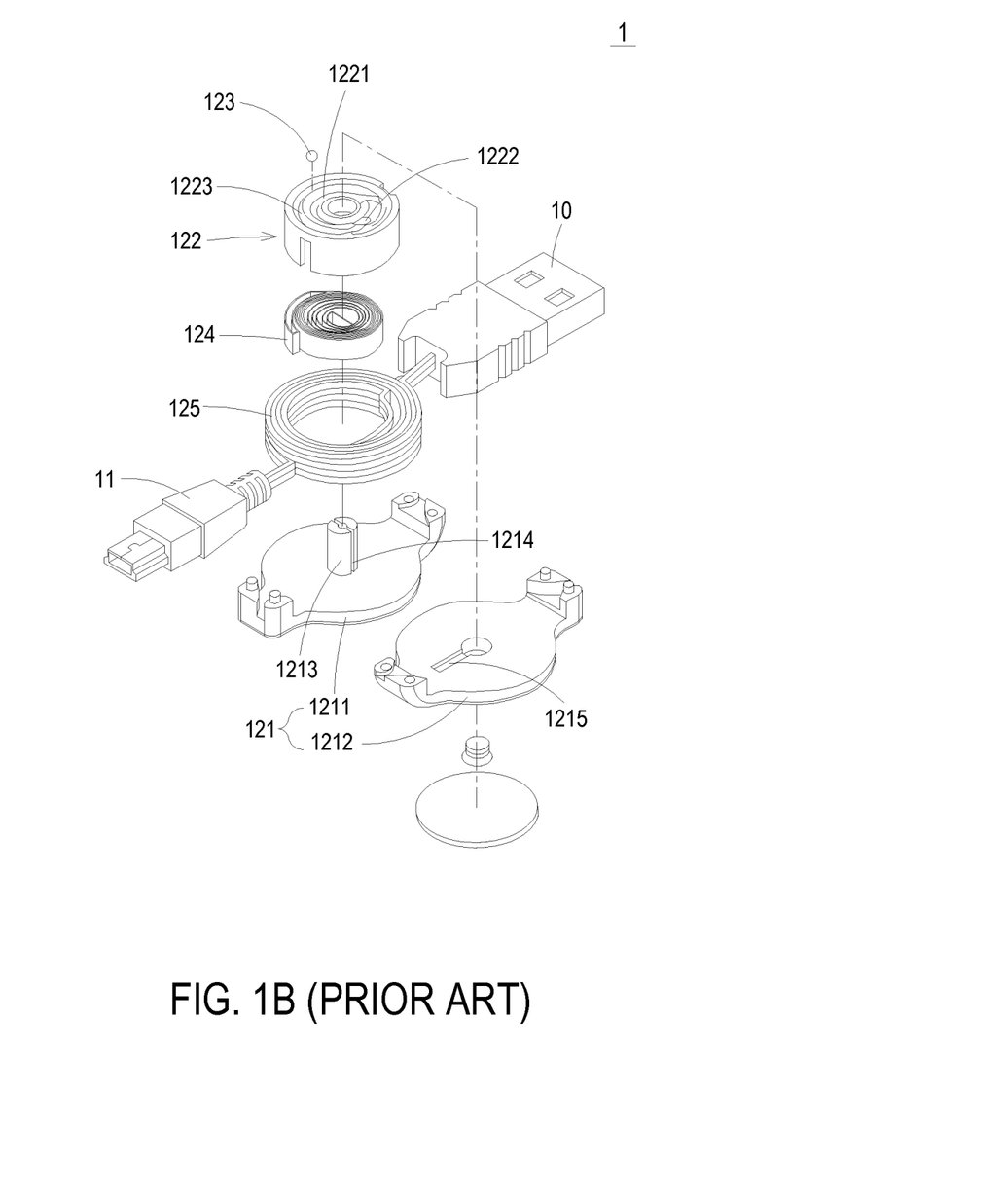
FIG. 1B is a schematic exploded view illustrating the conventional USB cable adapter shown in FIG. 1A.

Please refer to FIGS. 1A and 1B. FIGS. 1A and 1B are respectively schematic assembled and exploded views illustrating the conventional USB cable adapter. The USB cable adapter principally includes a USB connector 10, a signal connector 11 and a cable winding device 12. The USB connector 10 is coupled to an electronic device having a USB interface (e.g. a computer host). The signal connector 11 is coupled to an electronic device having a signal connecting interface (e.g. a digital camera or a charger).

The cable winding device 12 is interconnected between the USB connector 10 and the signal connector 11. The cable winding device 12 includes a case 121, a reel disc 122, a roller 123, a spiral spring 124 and a cable 125.

The case 121 comprises a first case element 1211 and a second case element 1212. A spool 1213 is extended from an inner surface of the first case element 1211 for securing the reel disc 122 thereon. A longitudinal gap 1214 is cut through the spool 1213 for anchoring the spiral spring 124 onto the spool 1213 such that the spiral spring 124 is fixed between the first case element 1211 and the reel disc 122. In addition, a confining groove 1215 is formed in an inner surface of the second case element 1212 such that the roller 123 is moveable along the confining groove 1215 after the first case element 1211 and the second case element 1212 are combined together.

The reel disc 122 is rotatable for winding the cable 125. A channel 1221, a guiding groove 1222 and a curved trough 1223 are formed in the outer surface of the reel disc 122. The guiding groove 1222 is disposed adjacent to the curved trough 1223 for anchoring the roller 123. The curved trough 1223 is disposed adjacent to the guiding groove 1222 and in communication with one end of the channel 1221 for restraining the movable range of the roller 123.

One end of the cable 125 is coupled to the USB connector 10, the other end thereof is coupled to the signal connector 11, and the intermediate portion thereof is wound inside of the reel disc 122. In response to pulling forces exerted on the USB connector 10 and the signal connector 11, the reel disc 122 and the spiral spring 124 are rotated counterclockwise such that the roller 123 moves in the channel 1221 toward the curved trough 1223. At the same time, the spiral spring 124 is being deformed. A sudden release of the pulling forces will cause the roller 123 to move in the guiding groove 1222 such that the reel disc 122 stops rotating and the cable 125 is locked. In other words, a user can lock the cable 125 by releasing the cable 125 after a desired length of the cable 125 has been pulled from the reel disc 122. Again, a continuous pulling operation of the cable 125 from the locked position will cause the roller 123 to move from the guiding groove 1222 to the channel 1221. Eventually, a release of the cable 125 causes the roller 123 to move in the guiding groove 1222 again for locking.

For rewinding the cable 125, the use may slightly pull the cable 125 to cause the roller 123 to clear from the guiding groove 1222. Next, a release of the cable 125 causes the compressed spiral spring 124 to release its stored energy to rotate the reel disc 122 clockwise. As a consequence, the cable 125 is completely rewound on the reel disc 122 if no stopping action is taken.

Although the cable winding device 12 can wind the cable 125 for storage, there are still some drawbacks. For example, the roller 123 has a relatively small size and is usually made of metal. During the process of assembling the cable winding device 12, it is difficult and troublesome to put the roller 123 on the correct position. Under this circumstance, the roller 123 of the cable winding device 12 is possibly lost if the installation of the roller 123 is improper. Moreover, the process of manufacturing the metal roller 123 also increases the cost of the cable winding device 12.

Therefore, there is a need of providing an improved cable winding device in order to obviate the drawbacks encountered in the prior art.

SUMMARY OF THE INVENTION

The present invention provides a cable winding device and a fixing and winding mechanism thereof in order to minimize the possibility of causing improper installation and minimize the possibility of losing any component of the cable winding device.

The present invention also provides a cable winding device and a fixing and winding mechanism thereof. Via a cable locking structure without any metal roller, the cost of fabricating the cable winding device will be reduced.

The present invention further provides a cable winding device and a fixing and winding mechanism thereof. Via an interaction of a cable locking device and a reel disc, the desired length of a retractable cable may be selected according to the user's requirement, and the cable pulled outside a case may be rewound on the reel disc anytime by pressing the cable locking structure.

In accordance with an aspect of the present invention, there is provided a cable winding device. The cable winding device comprises a case, a reel disc, a cable, and a cable locking structure. The case comprises a first case element and a second case element. The reel disc is disposed between the first case element and the second case element, wherein the reel disc has a leaf spring. The cable is wound on the reel disc. The cable locking structure has a fixing part and at least partially penetrates the first case element and the reel disc. When a pulling operation of the cable causes the leaf spring to be sustained against the fixing part, a desired length of the cable is pulled out from the case and locked. When the cable locking structure is pressed and the fixing part is detached from the leaf spring, the cable pulled outside the case is rewound on the reel disc.

In accordance with another aspect of the present invention, there is provided a fixing and winding mechanism of a cable winding device. The cable winding device comprises a case, a reel disc, and a cable. The case comprises a first case element and a second case element. The reel disc is disposed between the first case element and the second case element. The cable is wound on the reel disc. The fixing and winding mechanism comprises a leaf spring and a cable locking structure. The leaf spring is disposed on the reel disc. The cable locking structure has a fixing part and at least partially penetrates the first case element and the reel disc. When a pulling operation of the cable causes the leaf spring to be sustained against the fixing part, a desired length of the cable is pulled out from the case and locked. When the cable locking structure is pressed and the fixing part is detached from the leaf spring, the cable pulled outside the case is rewound on the reel disc.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2A:
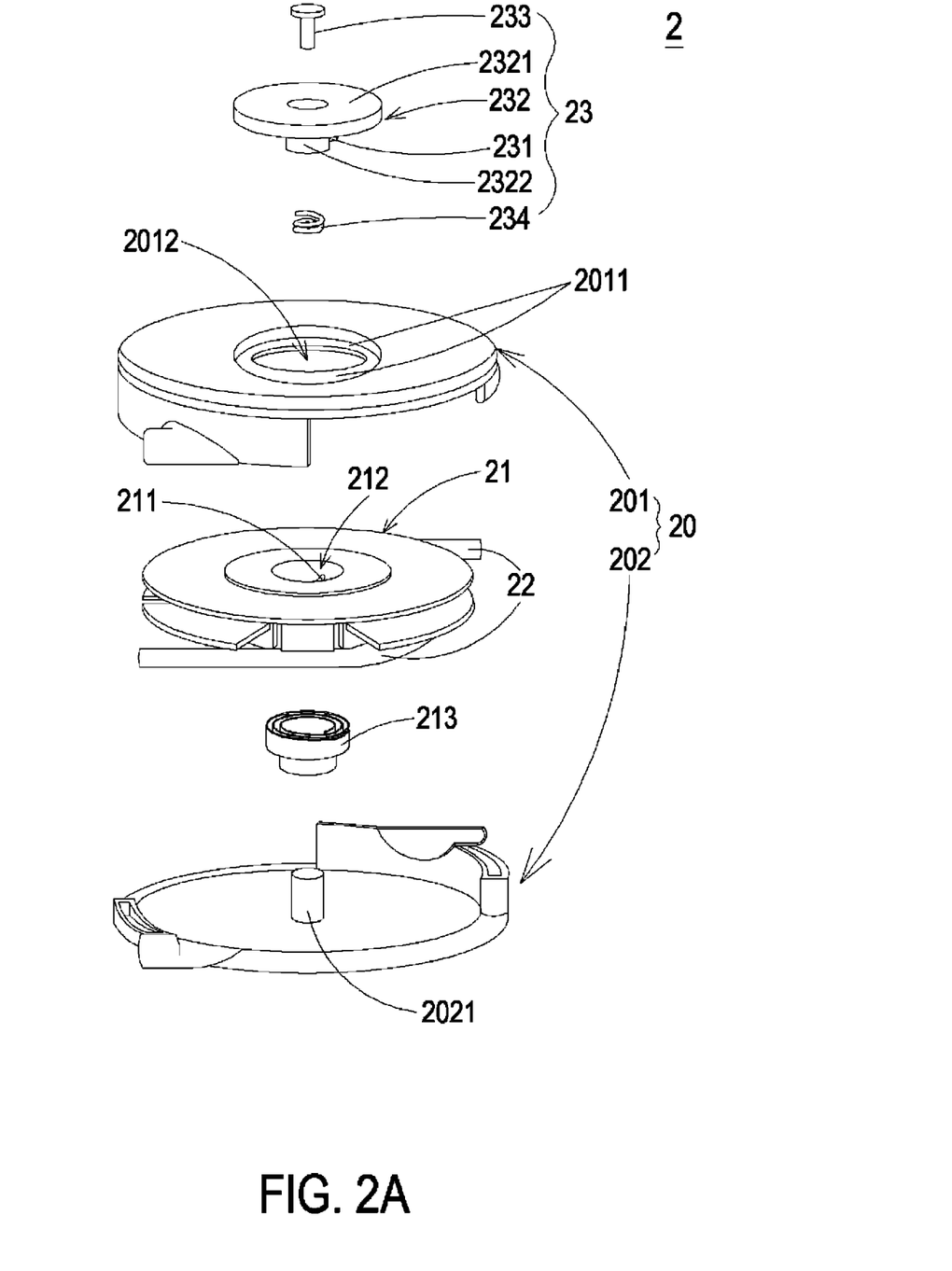
FIG. 2A is a schematic exploded view illustrating a cable winding device according to an embodiment of the present invention.
Figure 2B:
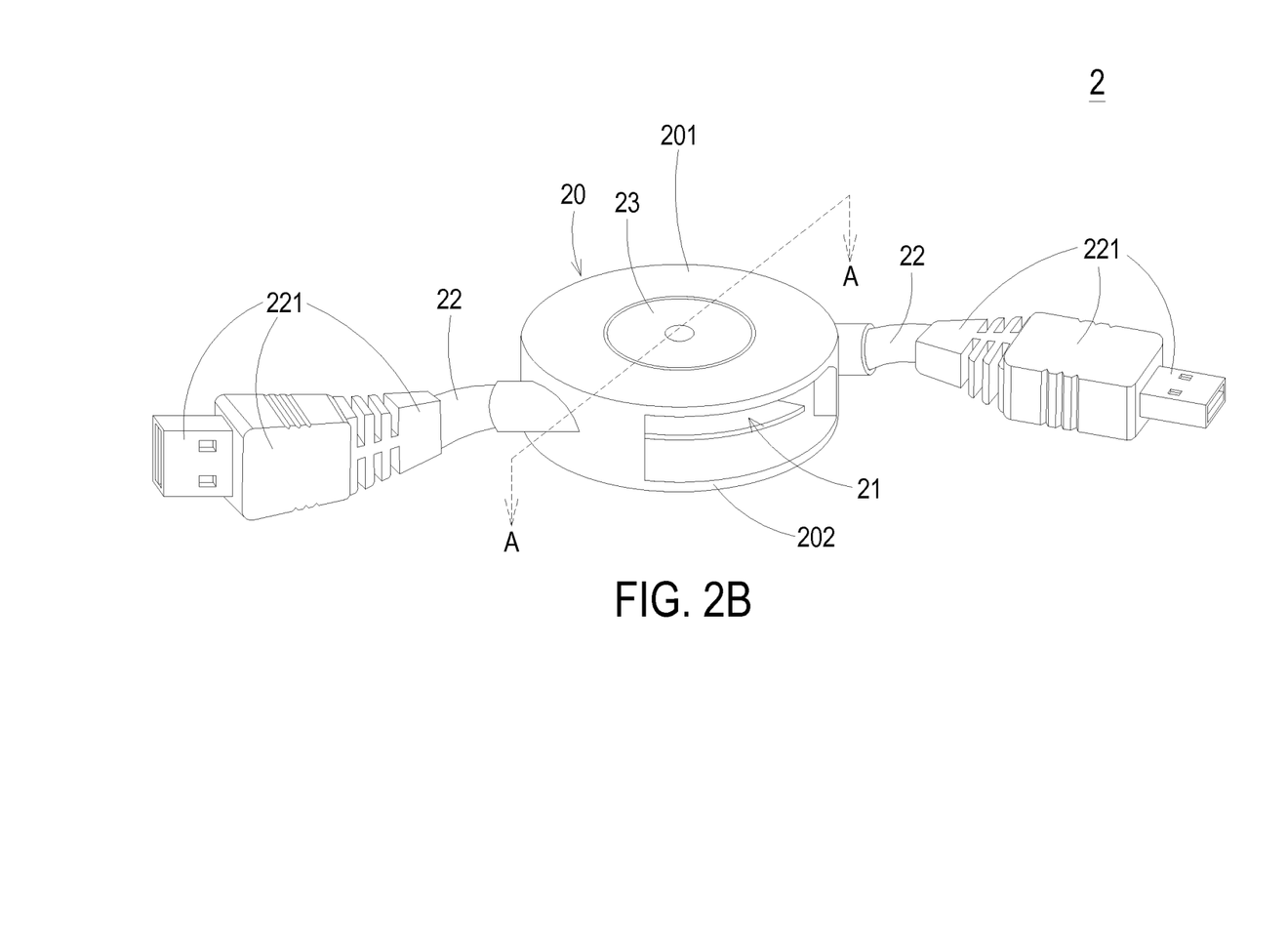
FIG. 2B is a schematic assembled view illustrating the cable winding device shown in FIG. 2A.

Please refer to FIGS. 2A and 2B. FIG. 2A is a schematic exploded view illustrating a cable winding device according to an embodiment of the present invention. FIG. 2B is a schematic assembled view illustrating the cable winding device shown in FIG. 2A. The cable winding device 2 of the present invention comprises a case 20, a reel disc 21, a cable 22 and a cable locking structure 23. The case 20 comprises a first case element 201 and a second case element 202. The reel disc 21 is disposed between the first case element 201 and the second case element 202 and has a leaf spring 211. The cable 22 is wound on the reel disc 21 and stored within the case 20, and both ends of the cable 22 have connectors 221, which are coupled to electronic devices having the identical connecting interface. An example of the cable 22 is not limited to a DC power cable, a signal transmission cable, and a data transmission cable. In this embodiment, the connectors 221 of the cable 22 are USB connectors, but not limited thereto. The cable locking structure 23 has a fixing part 231 and at least partially penetrates the first case element 201 and the cable 21. When a pulling operation of the cable 22 causes the leaf spring 211 to be sustained against the fixing part 231, a desired length of the cable 22 is pulled out from the case 20 and locked. For example, when a user pulls out the connectors 221 at both ends of the cable 22 to detach from the case 20, the reel disc 21 is driven to rotate by a pull force such that the leaf spring 211 is sustained against the fixing part 231 of the cable locking structure 23 and the desired length of the cable 22 is pulled out and locked. For rewinding the cable 22, the user may press the cable locking structure 23 to cause the cable locking structure 23 to move downwardly, so that the fixing part 231 is detached from the leaf spring 211 and the cable 22 pulled outside the case 20 is rewound on the reel disc 21. Due to the cable locking structure 23 without any metal roller, the cost of fabricating the cable winding device 2 will be reduced and the possibility of causing improper installation and losing any component of the cable winding device 2 will be minimized. In addition, via an interaction of the cable locking device 23 and the reel disc 21, the desired length of a retractable cable 22 may be selected according to the user's requirement, and the cable 22 pulled outside the case 20 may be rewound on the reel disc 21 anytime by pressing the cable locking structure 23.

In some embodiments, the reel disc 21 of the cable winding device 2 of the present invention is coaxial with the cable locking structure 23 and has a receiving groove 212 arranged around an axial center for receiving at least parts of the cable locking structure 23, wherein the leaf spring 211 is disposed on the receiving groove 212 and is sustained against or detached from the fixing part 231 of the cable locking structure 23 inside the receiving groove 212, but not limited thereto. In other embodiments, the cable locking structure 23 comprises a main body 232 having a coupling part 2321 and a hollow spool 2322, wherein the coupling part 2321 is at least partially disposed on a coupling groove 2011 of the first case element 201 of the case 20, and the hollow spool 2322 at least partially penetrates an opening 2012 of the first case element 201 and the receiving groove 212 of the reel disc 21. Moreover, the fixing part 231 of the cable locking structure 23 is formed on and extended from a sidewall of the hollow spool 2322, for example, by injection molding. In other words, the coupling part 2321, the hollow spool 2322 and the fixing part 231 can be integrally formed, but not limited thereto.

Figure 4A:
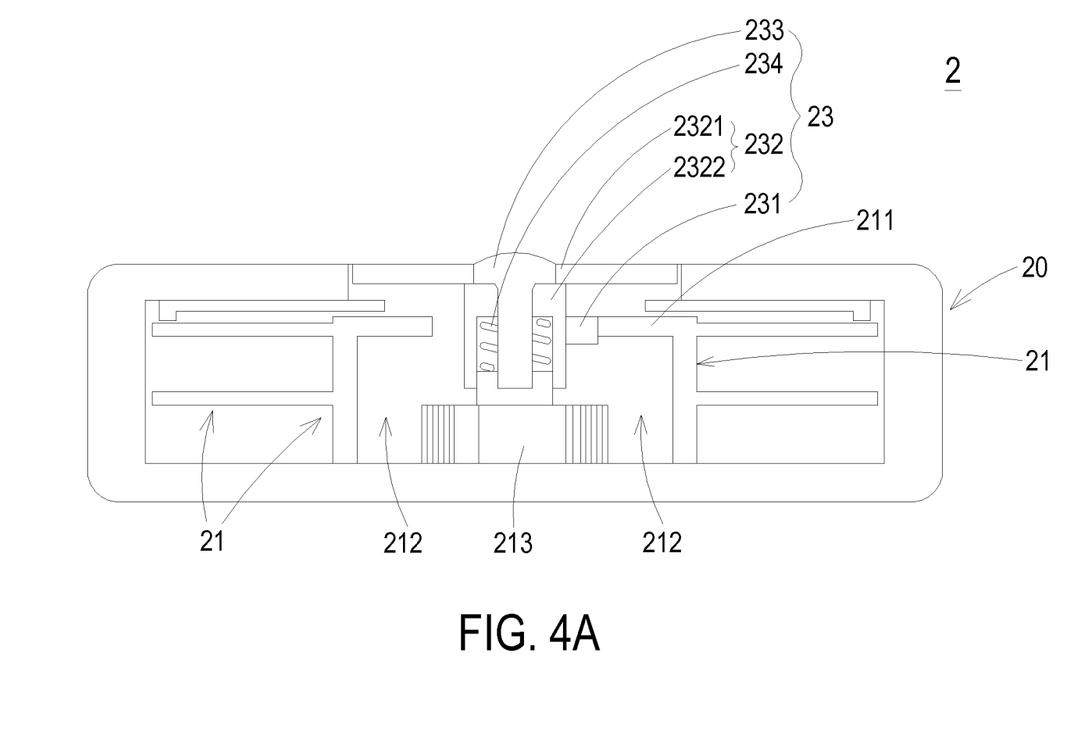
FIG. 4A is a schematic cross-sectional view of the cable winding device shown in FIG. 2B and taken along the line AA when a fixing part of a cable locking structure is sustained against a leaf spring of the reel disc.

In this embodiment, the reel disc 21 of the cable winding device 2 further comprises a spiral spring 213 disposed on the receiving groove 212 for providing a winding force (as shown in FIG. 4A). An end of the spiral spring 213 is coupled with a spool 2021 of the second case element 202 of the case 20, and the spool 2021 may be axis of rotation of the reel disc 21 and the spiral spring 213.

Figure 3A:
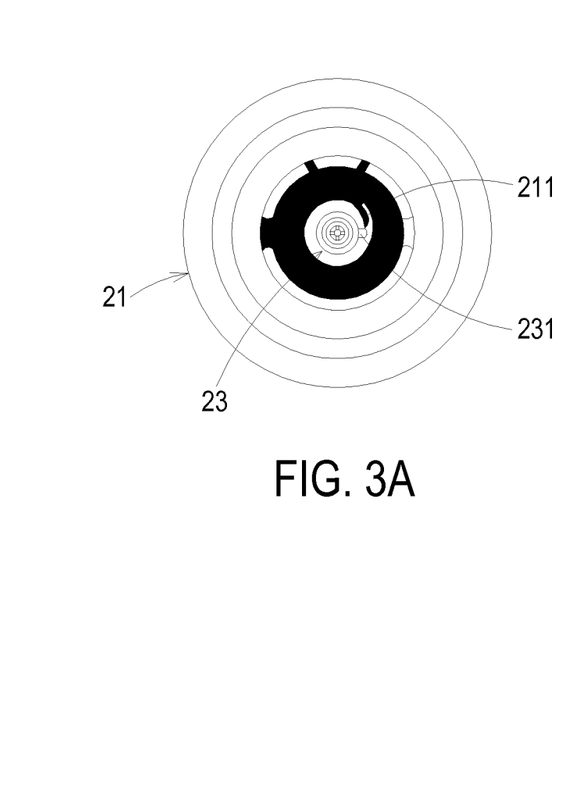
FIG. 3A is a bottom cross-sectional view illustrating the cable winding device shown in FIG. 2B.
Figure 3B:
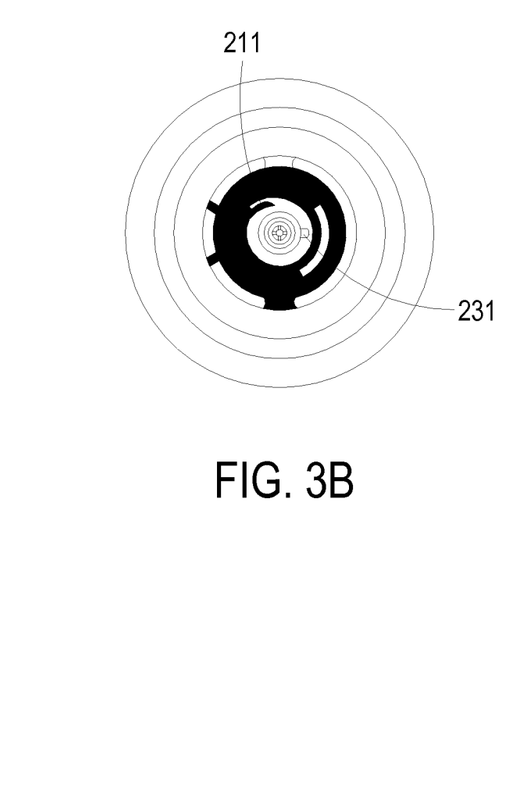
FIGS. 3B, 3C, 3D and 3E are schematic views illustrating rotations of a reel disc shown in FIG. 3A.
Figure 3C:
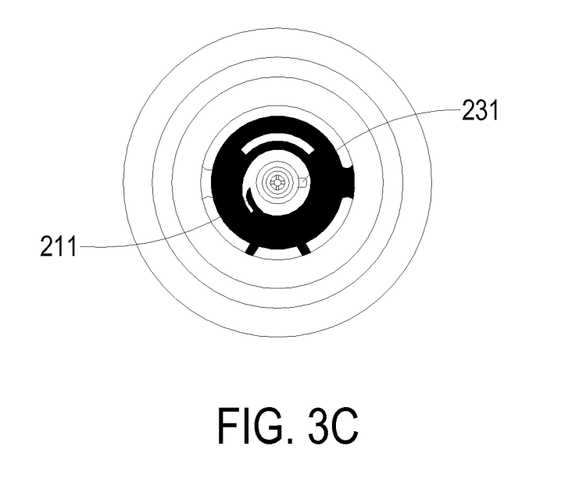
Figure 3D:
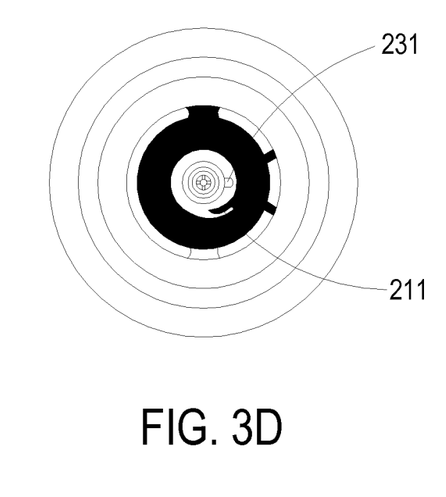

FIG. 3A is a bottom cross-sectional view illustrating the cable winding device shown in FIG. 2B. FIGS. 3B, 3C, 3D and 3E are schematic views illustrating rotations of a reel disc shown in FIG. 3A. As shown in FIGS. 2B, 3A, 3B, 3C, 3D and 3E, the cable locking structure 23 of the cable winding device 2 of the present invention is coaxial with the reel disc 21. When a user pulls out the connectors 221 at both ends of the cable 22 to detach from the case 20, the reel disc 21 is driven to rotate by a pull force. Under this circumstance, the leaf spring 211 of the reel disc 21 will be sustained against the fixing part 231 of the cable locking structure 23 when the reel disc 21 rotates across a preset angle such that a desired length or a preset length is locked.

Figure 3E:
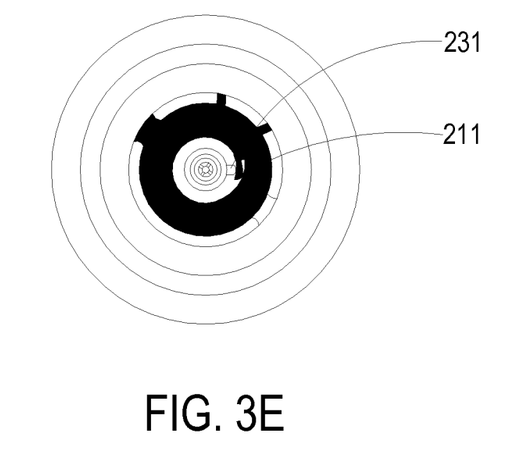

In this embodiment, the preset angle takes 330 degrees for example (as shown in FIG. 3E). That is to say, the leaf spring 211 of the reel disc 21 is sustained against the fixing part 231 of the cable locking structure 23 since the reel disc 21 has rotated across an angle of 330 degrees such that the desired length or the preset length is locked. Additionally, the preset angle and the desired length or the preset length may be configured or selected according to the requirements of practical application, and hence the present invention achieves the advantages of selecting the cable 22 with a specific length or a specific position freely.

Figure 4B:
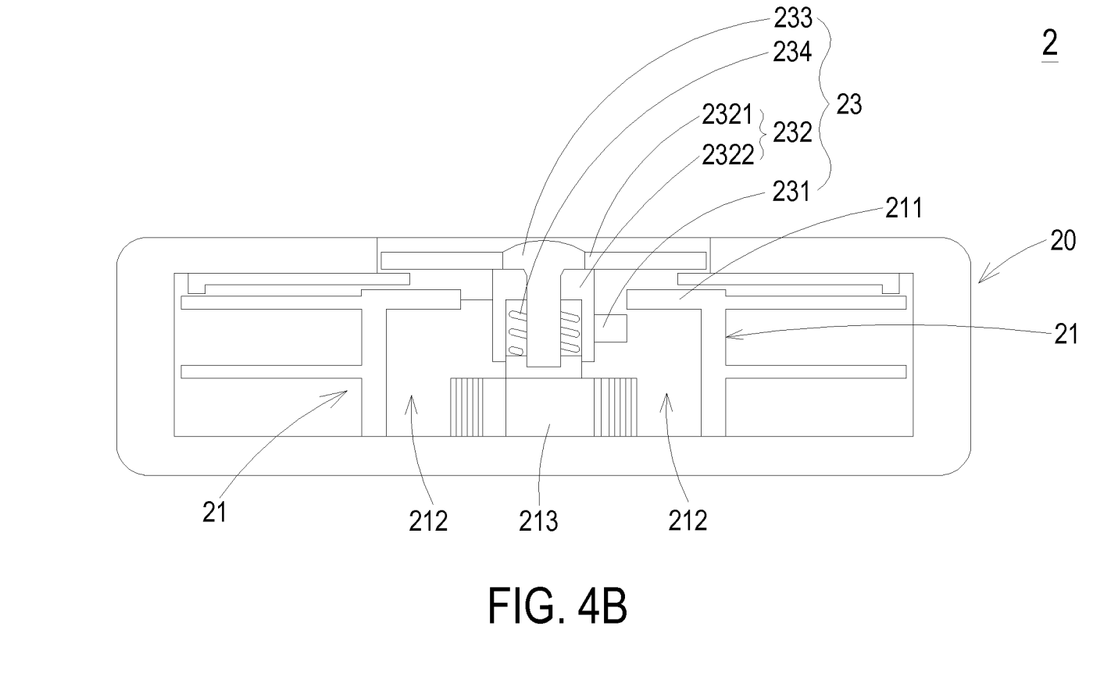
FIG. 4B is a schematic cross-sectional view of the cable winding device shown in FIG. 4A when the cable locking structure is pressed.

Please refer to FIGS. 2A, 2B, 4A, and 4B. FIG. 4A is a schematic cross-sectional view of the cable winding device shown in FIG. 2B and taken along the line AA when a fixing part of a cable locking structure is sustained against a leaf spring of the reel disc. FIG. 4B is a schematic cross-sectional view of the cable winding device shown in FIG. 4A when the cable locking structure is pressed. When the leaf spring 211 of the reel disc 21 is sustained against the fixing part 231 of the cable locking structure 23 (as shown in FIG. 4A), a desired length of the cable 22 is locked. For rewinding the cable 22, the user may press the cable locking structure 23 to cause the cable locking structure 23 to move downwardly (as shown in FIG. 4B), so that the fixing part 231 is detached from the leaf spring 211 and the cable 22 pulled outside the case 20 is rewound on the reel disc 21 due to the winding force provided by the spiral spring 213. Therefore, via an interaction of the cable locking device 23 and the reel disc 21, the desired length of the retractable cable 22 may be selected according to the user's requirement, and the cable 22 pulled outside the case 20 may be rewound on the reel disc 21 anytime by pressing the cable locking structure 23.

According to the concept of the present invention, the cable locking structure 23 of the cable winding device 2 further comprises a press element 233 and a spring element 234, wherein the spring element 234 is disposed inside the hollow spool 2322 of the main body 232 of the cable locking structure 23 and is sustained against the reel disc 21, and the press element 233 at least partially penetrates the coupling part 2321 and the hollow spool 2322 of the main body 232 and the spring element 234.

For rewinding the cable 22, the user may press the press element 233 of the cable locking structure 23 to cause the cable locking structure 23 to move downwardly and cause the spring element 234 to be deformed, so that the fixing part 231 is detached from the leaf spring 211 and the cable 22 pulled outside the case 20 is rewound on the reel disc 21. Under this circumstance, when a releasing operation of the press element 233 causes the spring element 234 to release the stored energy, the cable locking structure 23 moves back to the original position, hence the aforementioned operations may be repeated.

Figure 5:
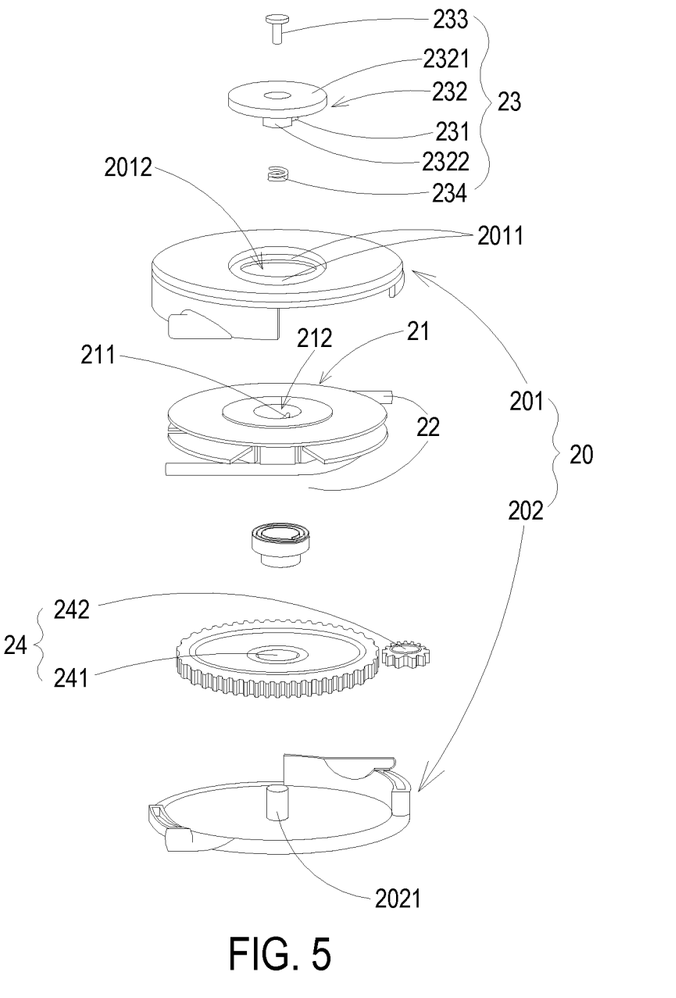
FIG. 5 is a schematic exploded view illustrating a cable winding device according to another embodiment of the present invention.

Please refer to FIG. 5, which is a schematic exploded view illustrating a cable winding device according to another embodiment of the present invention. In this embodiment as shown in FIG. 5, the cable winding device 2 also comprises a case 20, a reel disc 21, a cable 22, and a cable locking structure 23, wherein the structures and the functions of the case 20, the reel disc 21, the cable 22, and the cable locking structure 23 are similar to those of the foresaid embodiment and thus are not redundantly described here. The difference is that the cable winding device 2 further comprises a deceleration assembly 24 disposed between the first case element 201 and the second case element 202 of the case 20 and connected with the reel disc 21 for decelerating the rotational speed of the reel disc 21 when the cable 22 pulled outside the case 20 is being rewound on the reel disc 21.

In some embodiments, it is preferred but not limited that the deceleration assembly 24 comprises a first gear 241 and a second gear 242, wherein the first gear 241 is coupled with the spool 2021 of the second case element 201 of the case 20 and connected with the spiral spring 213 of the reel disc 21, and the second gear 242 is disposed on an inner surface of the second case element 202 of the case 20 and coupled with the first gear 241. Certainly, the width of each tooth, the number of teeth, the distance between teeth, and the gear ratio may be configured and selected according to the requirements of practical application.

In this embodiment, since the first gear 241 and the second gear 242 are coupled with each other and have a particular gear ratio, the rotational kinetic energy of the reel disc 21 due to the winding force provided by the spiral spring 213 substantially expends on counteracting friction and transmitting as the mechanical energy of the first gear 241 and the second gear 242 of the deceleration assembly 24. As a result, the rotational speed of the reel disc 21 is decelerated effectively, so that the safety of rewinding the cable 22 on the reel disc 21 is promoted, and the abrasion of the cable 22 is avoidable.

From the above description, the present invention provides a cable winding device and a fixing and winding mechanism thereof. Via a cable locking structure without any metal roller, the cost of fabricating the cable winding device 2 will be reduced and the possibility of causing improper installation and losing any component of the cable winding device 2 will be minimized. Moreover, via an interaction of a cable locking device and a reel disc, the desired length of a retractable cable may be selected according to the user's requirement, and the cable pulled outside a case may be rewound on the reel disc anytime by pressing the cable locking structure.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cable winding device comprising:
    a case comprising a first case element and a second case element;
    a reel disc disposed between said first case element and said second case element, wherein said reel disc has a leaf spring;
    a cable wound on said reel disc; and
    a cable locking structure having a fixing part and at least partially penetrating said first case element and said reel disc;
    wherein a desired length of said cable is pulled out from said case and locked when a pulling operation of said cable causes said leaf spring to be sustained against said fixing part, and said cable pulled outside said case is rewound on said reel disc when said cable locking structure is pressed and said fixing part is detached from said leaf spring.

2. The cable winding device according to claim 1, wherein said reel disc is coaxial with said cable locking structure and has a receiving groove arranged around an axial center for receiving at least parts of said cable locking structure.

3. The cable winding device according to claim 2, wherein said leaf spring is disposed on said receiving groove and is sustained against or detached from said fixing part of said cable locking structure inside said receiving groove.

4. The cable winding device according to claim 2, wherein said cable locking structure further comprises a main body having a coupling part and a hollow spool, said coupling part is at least partially disposed on a coupling groove of said first case element of said case, and said hollow spool at least partially penetrates an opening of said first case element and said receiving groove of said reel disc.

5. The cable winding device according to claim 4, wherein said fixing part of said cable locking structure is formed on and extended from a sidewall of said hollow spool.

6. The cable winding device according to claim 4, wherein said cable locking structure further comprises:
   a spring element disposed inside said hollow spool of said main body and sustained against said reel disc; and
   a press element at least partially penetrating said coupling part and said hollow spool of said main body and said spring element;
   wherein said cable pulled outside said case is rewound on said reel disc and said spring element is deformed when said press element of said cable locking structure is pressed and said fixing part is detached from said leaf spring of said reel disc, and said cable locking structure moves back to the original position when a releasing operation of said press element causes said spring element to release the stored energy.

7. The cable winding device according to claim 2, wherein said reel disc further comprises a spiral spring disposed on said receiving groove of said reel disc for providing a winding force, an end of said spiral spring is coupled with a spool of said second case element of said case, and said spool is axis of rotation of said reel disc and said spiral spring.

8. The cable winding device according to claim 7 further comprising a deceleration assembly disposed between said first case element and said second case element and connected with said reel disc for decelerating the rotational speed of said reel disc when said cable pulled outside said case is being rewound on said reel disc.

9. The cable winding device according to claim 8, wherein said deceleration assembly comprises a first gear and a second gear, said first gear is coupled with said spool of said second case element of said case and connected with said spiral spring of said reel disc, and said second gear is disposed on an inner surface of said second case element of said case and coupled with said first gear.

10. A fixing and winding mechanism of a cable winding device, said cable winding device comprising a case, a reel disc and a cable, said case comprising a first case element and a second case element, said reel disc being disposed between said first case element and said second case element, said cable being wound on said reel disc, said fixing and winding mechanism comprising:
   a leaf spring disposed on said reel disc; and
   a cable locking structure having a fixing part and at least partially penetrating said first case element and said reel disc;
   wherein a desired length of said cable is pulled out from said case and locked when a pulling operation of said cable causes said leaf spring to be sustained against said fixing part, and said cable pulled outside said case is rewound on said reel disc when said cable locking structure is pressed and said fixing part is detached from said leaf spring.

* * * * *